A. W. HART.
MINNOW BUCKET.
APPLICATION FILED MAY 18, 1908.
913,379.
Patented Feb. 23, 1909.
6 SHEETS—SHEET 2.
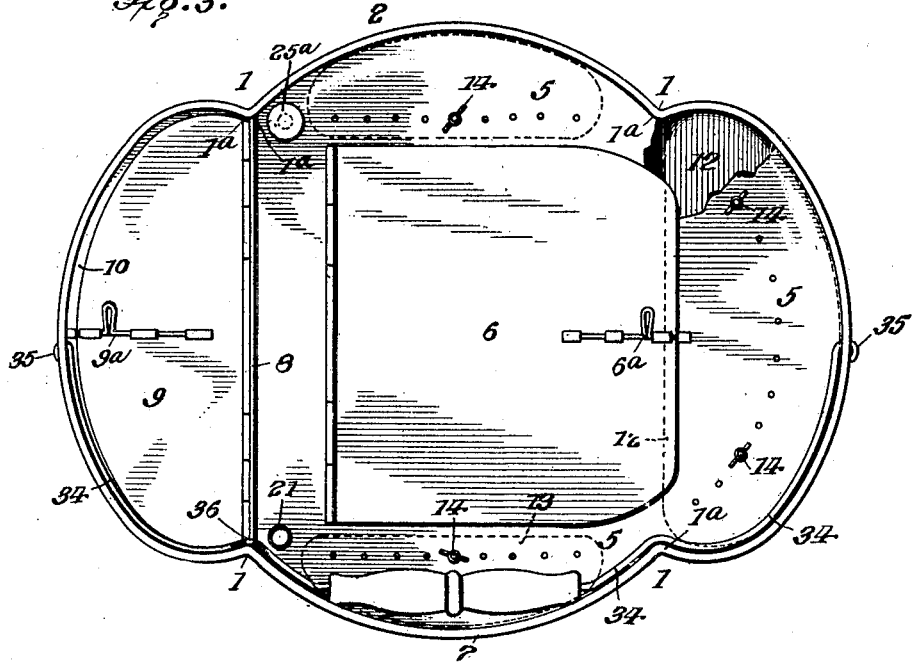
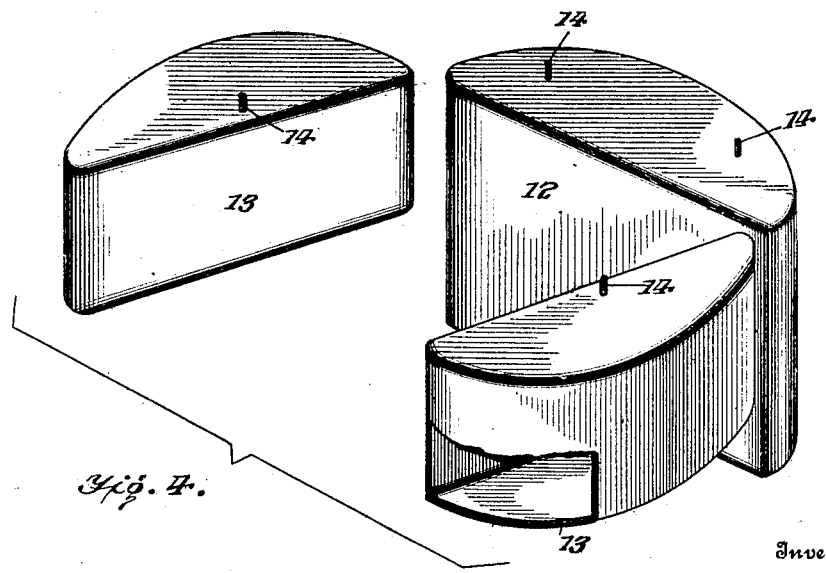
Witnesses
L. H. Schmidt
F. E. Barry
Inventor
Amos W. Hart

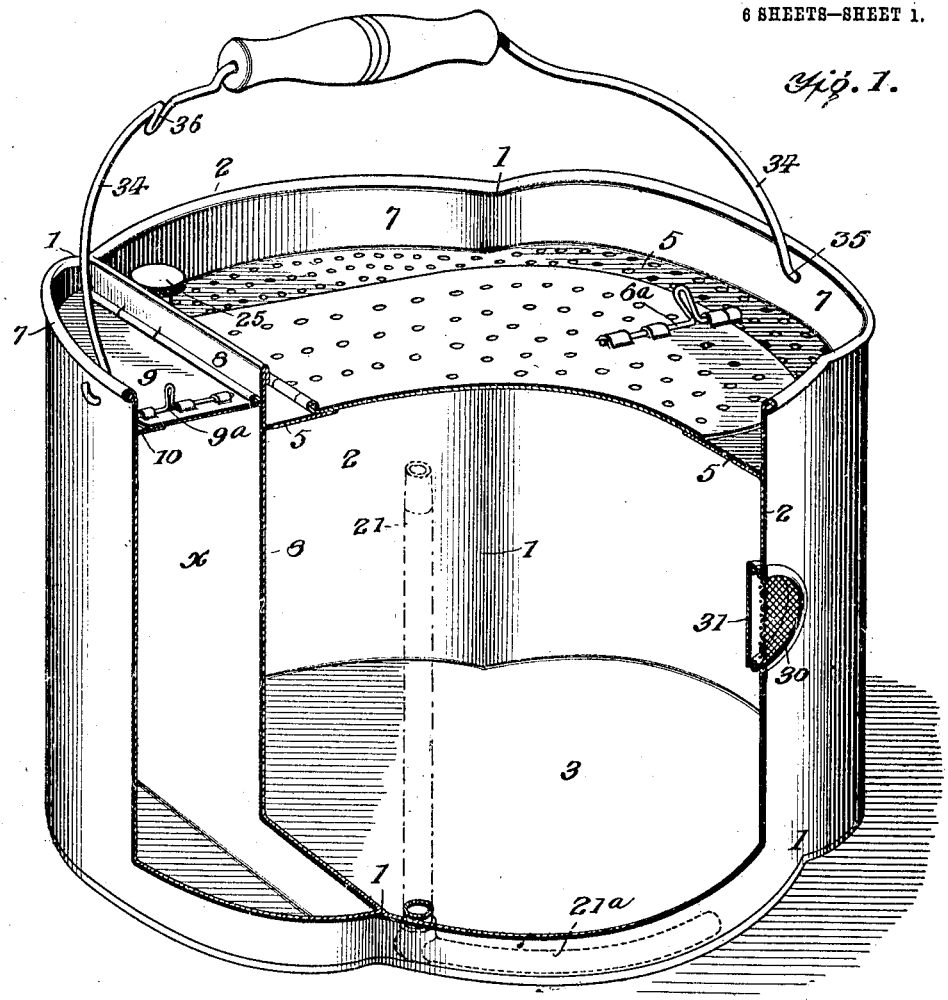
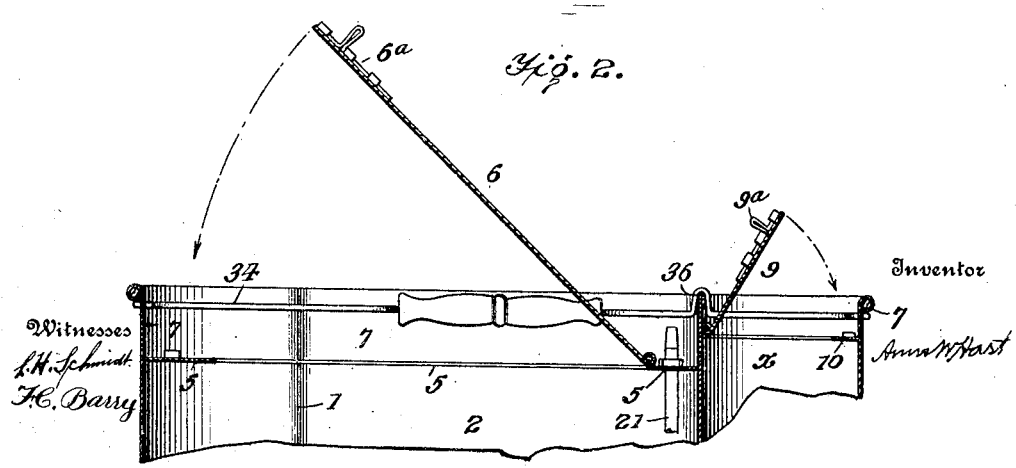

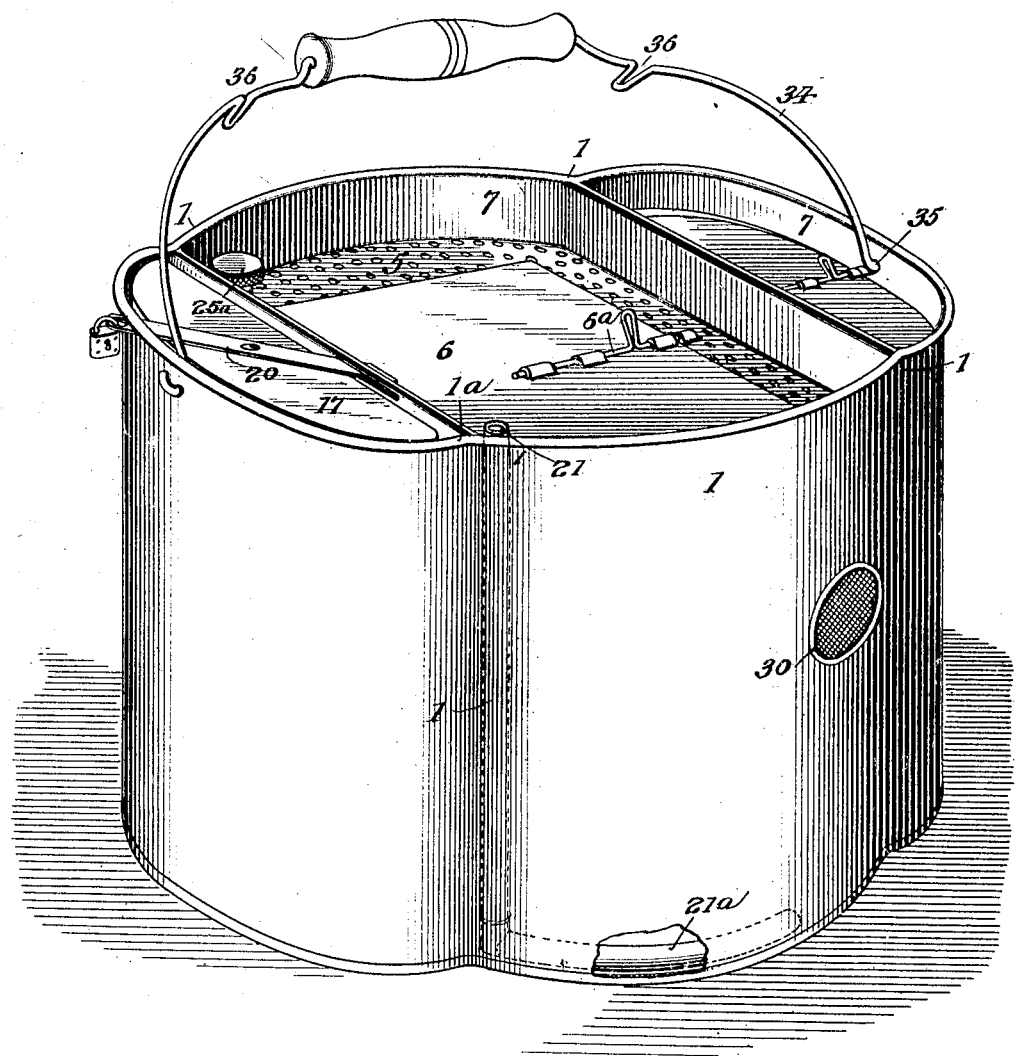

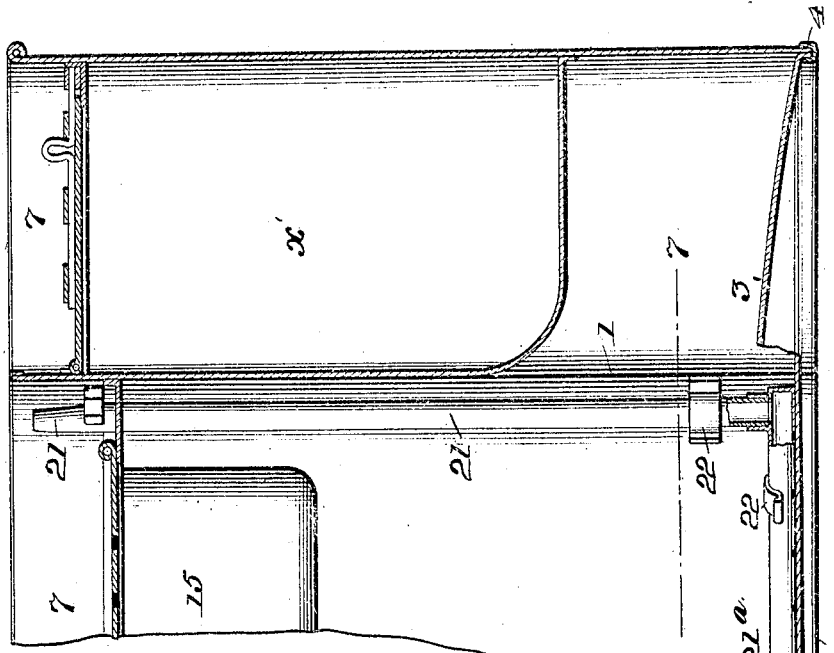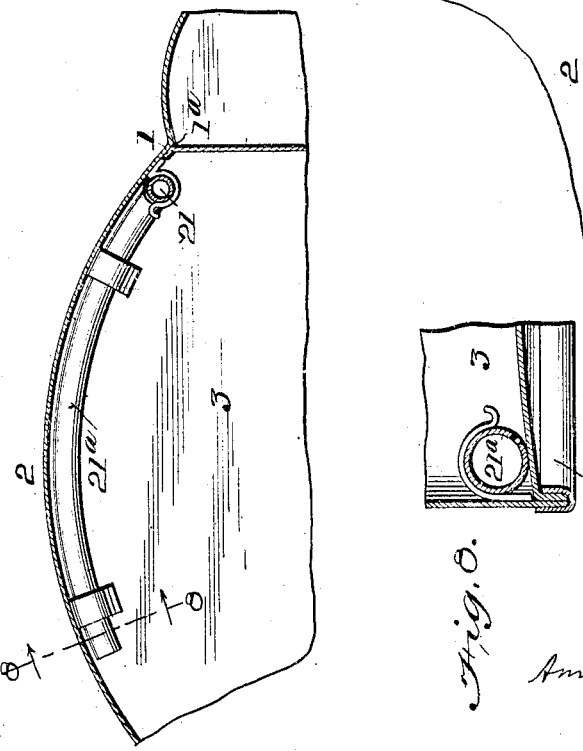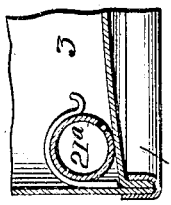

A. W. HART.
MINNOW BUCKET.
APPLICATION FILED MAY 18, 1908.
913,379.
Patented Feb. 23, 1909.
6 SHEETS—SHEET 5.
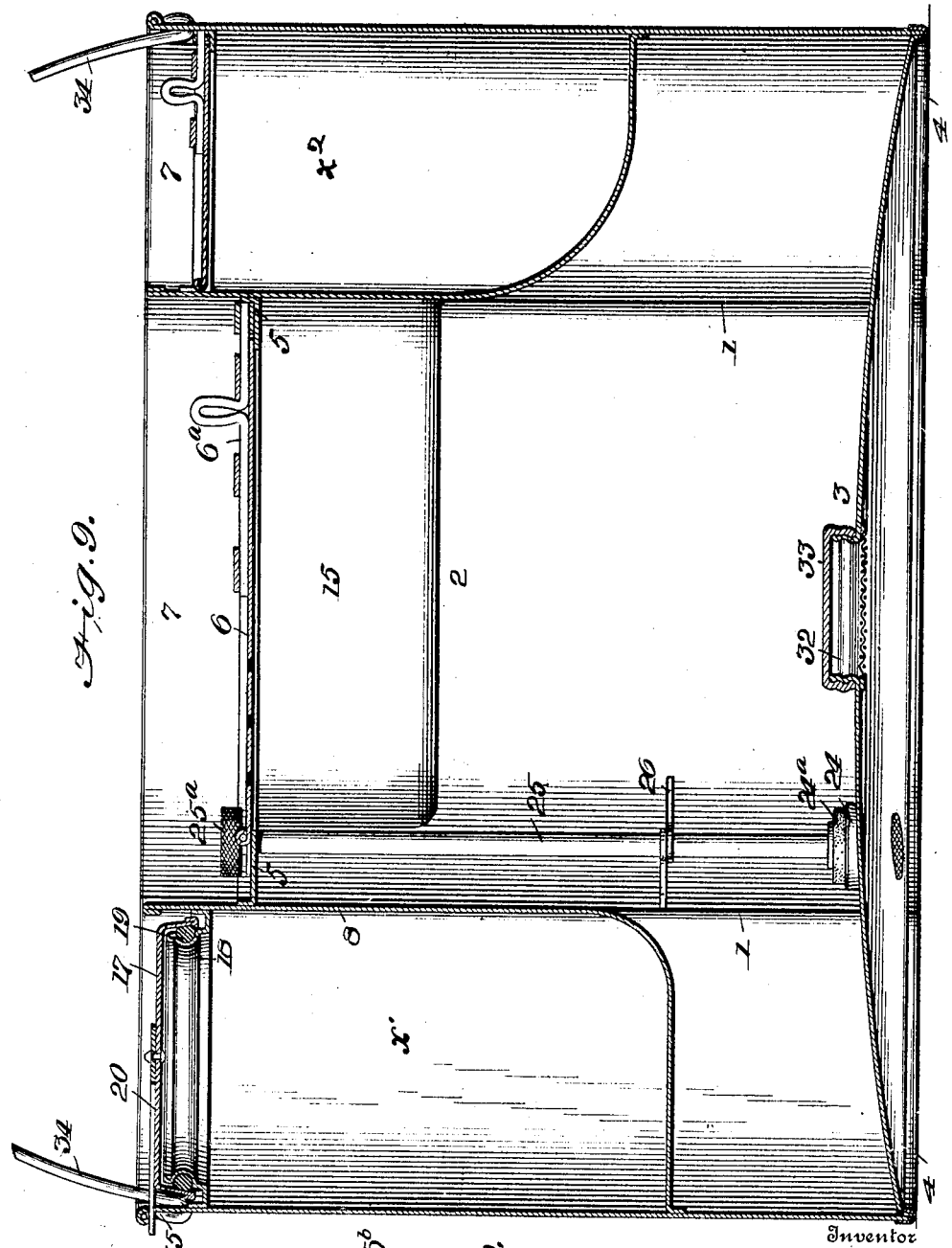
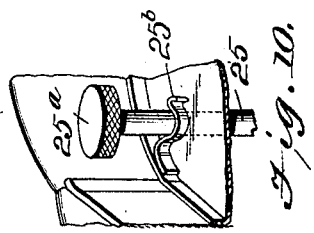
Witnesses
F. C. Barry
L. H. Schmidt
Inventor
Amos W. Hart

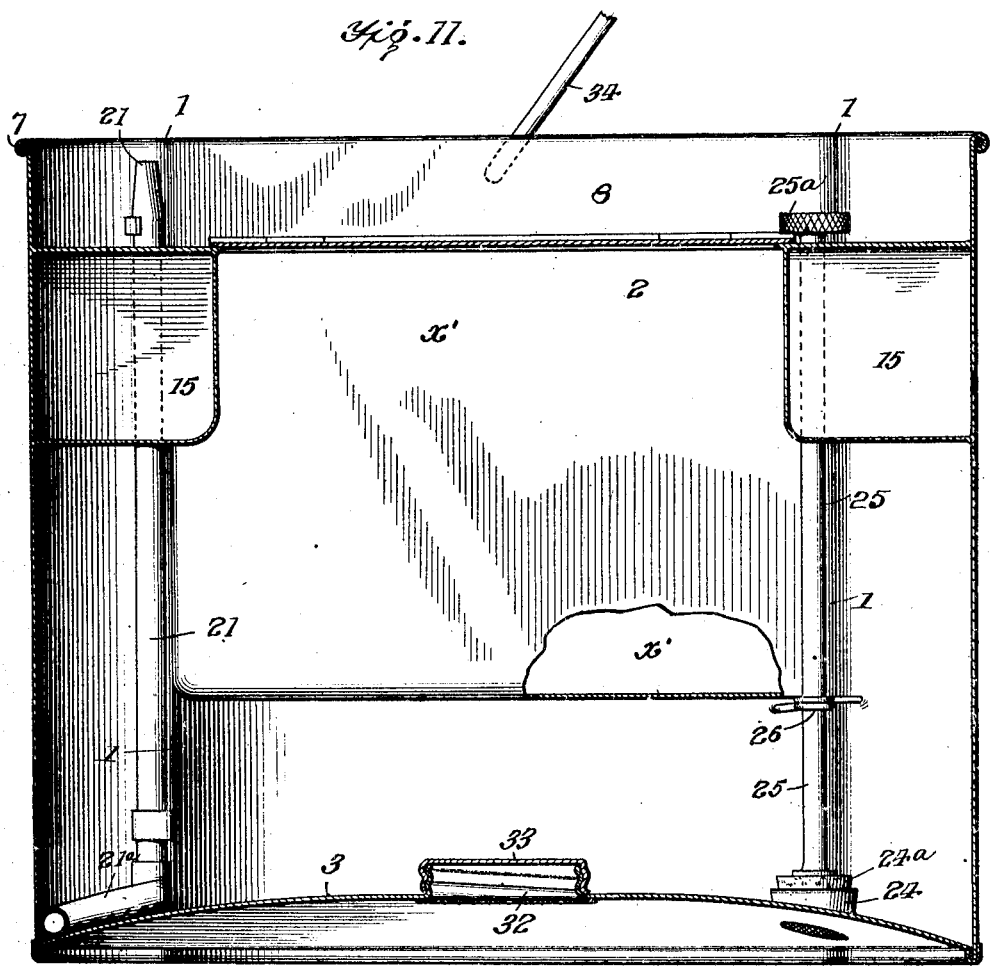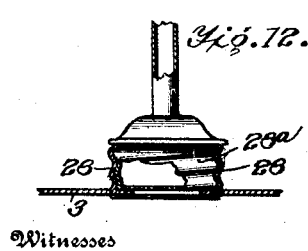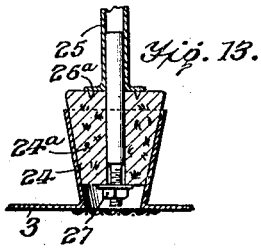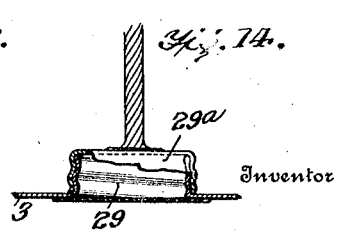

UNITED STATES PATENT OFFICE.

AMOS W. HART, OF WASHINGTON, DISTRICT OF COLUMBIA.

MINNOW-BUCKET.

No. 913,379.　　　　Specification of Letters Patent.　　　　Patented Feb. 23, 1909.

Application filed May 18, 1908. Serial No. 433,471.

*To all whom it may concern:*

Be it known that I, AMOS W. HART, a citizen of the United States, and a resident of Washington city, in the District of Columbia, United States of America, have invented an Improvement in Minnow-Buckets, of which the following is a specification.

My improvement in minnow-buckets consists in a new and superior form and construction of the body whereby various important advantages are attained in the provision of one or more interior compartments which serve as air chambers, or floats, as well as the more important purpose of receptacles for lunch, ice, or drinking water, and reels, or other form of fishing tackle, and various other articles, also for supplementary bail of a kind which it may be desirable to keep separate from the minnows in the main chamber of the bucket; in detachable means for conducting air for aerating water in the main chamber, to prolong the life of the minnows; in means for admitting and discharging water through the bottom and sides and permitting circulation when desired; and in other features hereinafter described and claimed.

In the accompanying drawings, Figure 1 is a perspective view of my improved bucket—a portion of the side being broken away. Fig. 2 is a longitudinal section of the upper portion of such bucket, the covers or lids of the main and auxiliary compartments being shown raised. Fig. 3 is a plan view of the bucket illustrating the position of detachable floats or air chambers therein. Fig. 4 is a perspective view of the said floats or air chambers detached but arranged in the same local relation to each other as in Fig. 3. Fig. 5 is a perspective view of the bucket similar to that shown in Fig. 1, save that it has two end compartments and that a different lid or cover is provided for one of them. Fig. 6 is a vertical longitudinal section of a portion of the bucket as shown constructed in Fig. 1; such view being particularly for the purpose of illustrating the arrangement and attachment of the means for introducing air into the main compartment. Fig. 7 is a vertical horizontal section on the line 7—7 of Fig. 6. Fig. 8 is a cross section on the line 8—8 of Fig. 7. Fig. 9 is a central longitudinal section of the bucket provided with fixed or permanent floats or air chambers. Fig. 10 is a detail perspective showing a spring clamp for the stopper rod or stem. Fig. 11 is a cross section of the bucket constructed as shown in Fig. 9. Figs. 12, 13 and 14, are views showing different forms of stoppers or valves for a water-admission and discharge opening in the bottom of the bucket.

In plan, the general form of the body of bucket is elliptical, and each of the sides is corrugated vertically at two points thus forming exteriorly two vertical in-bends 1, and interiorly two corresponding ribs, as shown in several figures. The side portions that intervene these corrugations thus constitute swells or convexities 2—see Figs. 1, 3, and 5. The elliptical shape has advantages over the circular one, since it enables the bucket to be placed in comparatively narrow spaces, for example, under low boat-thwarts and carriage-seats; it can also be carried more easily alongside the legs in walking. The sides of an elliptical bucket are, however, much weaker than the narrower ends, and this I more than compensate for by the vertical corrugations 1, which, as will be apparent, greatly stiffen and strengthen the sides without adding appreciably to the weight of the bucket. Another important advantage is attained in use of the bucket, in that the interior or chamber of the same is thus practically divided into side and end pockets in which minnows tend to collect when pursued, so that their capture is rendered much easier. In fact, they may be caught in the pockets with the hand, with comparative ease—an operation that is extremely difficult in circular buckets. Further, the ribs 1 in a measure arrest and break waves that tend to form and sweep from end to end of the chamber, when the bucket is being carried by hand, or in boats, cars, or carriages. In other words, there is much less swash in this bucket than in others of the usual forms, whereby minnows are less disturbed and weakened and their life therefore prolonged. The opposition to wave motion or swash offered by the ribs 1 also results to some extent in aeration of the water.

The bottom 3 of the bucket is concavo-convex—see Figs. 9 and 11—the curve being upward, which greatly stiffens the body, and is otherwise advantageous. In fact, as practical test has demonstrated, with the sides corrugated and the bottom arched as shown, the body of the bucket has remarkable strength and stiffness, and may be hence constructed of thinner sheet metal than is usually employed in buckets, and therefore reduced in weight.

As shown for example in Fig. 8, the edge of the bottom 3, has a downturned flange that is soldered to the adjacent edge of the body, and a metal strip 4, which is U-shape in cross section, is applied and soldered to these edges so as to cover and protect them as well as hold them firmly connected. It is obvious that the wear strip or cap 4 thus provided is the only portion that comes in contact with a floor or other surface upon which the bucket may be set, and it takes a better or firmer hold on such surface, especially rough ones, so that it is less liable than flat-bottomed buckets to slip or slide thereon.

The top 5 of the main chamber is flat and placed about an inch below the edge of the body and is provided with an opening closed by a hinged lid or cover 6 having a suitable fastening $6^a$ which, in this instance, is a slidable bolt. The edge 7 of the body proper—see Fig. 1—projects at least an inch above the top 6, and thus forms a rim that prevents water swashing over, also provides a receptacle for ice when required, and for water when filling the bucket from a spigot.

A vertical transverse partition 8—see Fig. 1—extends between two opposite ribs 1 and above the top 5 to the same height as the body rim 7. The partition may extend clear to the bottom 3, as shown by full lines Fig. 1, or about two-thirds the distance, as shown in Figs. 9 and 11. In the former case (Fig. 1) a long pocket or supplemental receptacle $x$ is formed, which has about the same depth as the bucket. In the other case, there is formed a shorter pocket $x'$, whose bottom is located about two-thirds the distance from the top of the bucket. By this means, a space is provided beneath the pocket $x'$, which constitutes an extension or enlargement of the minnow chamber. For this reason, the shorter pocket $x'$ is in general to be preferred to the longer one $x$. In either case, the pocket is provided with a lid or cover. In Figs. 1—3, the cover 9 is hinged to, and closes upon, a narrow horizontal flange or ledge 10 and is secured by a fastening $9^a$ similar to that of the lid or cover 6 of the main chamber. Such cover 9 lies a little above the level of the top 5 of the latter chamber. The bucket may be made floatable by fixed or detachable floats or air chambers.

Figs. 3 and 4 illustrate the construction and application of three detachable floats 12 and 13 which are segmental in form and arranged in the large or main chamber of the bucket directly under its top. They may be secured by various forms of fastenings, but in this instance I show each of the floats provided with one or more screws 14 that project up through holes in the flat top and have nuts applied thereto. It will be understood that the supplemental end chamber or compartment $x$ serves as a fourth float, and balances the larger detachable end float 12.

Figs. 6, 9 and 11, show fixed side floats, or air-chambers 15, and an end float or air chamber $x^2$, arranged directly under the bucket top and forming permanent features of construction. It is apparent that in this case the side and top of the bucket body form two sides of the air-chambers so that the extent and weight of metal of the fixed floats are less than those of the removable ones.

In Figs. 5 and 9, I show a lid or cover 17 which is water-tight. It has a deep and slightly inclined flange which passes over a fixed flange 18 forming a rigid portion of the bucket top. A rubber cord 19 is held in a groove formed in, and extending around, the fixed flange, and to close the cover it is pressed down over it. To fasten the cover, any suitable means may be employed, but I show a flat bar 20 pivoted flat on the cover and its ends passing through slots in the rim and partition of the bucket. A padlock or other device may be applied to the outer end of the bar, outside the rim, to prevent displacement of the bar and accidental release of the cover. With this form of cover the bucket may be submerged without danger of water entering the pocket, which is desirable and advantageous when lunch, tackle, or other articles liable to injury, if wet, are contained in the pocket.

The bucket may be provided with a detachable air-conductor, or pipe 21, $21^a$—see Figs. 5, 6, 7, and 8—for conveying air into the water. The vertical pipe 21 is arranged close alongside the inner wall of the minnow chamber, and preferably adjacent to one of the two ribs or corrugations which are next the partition of the air chambers. The lower end of this pipe 21 fits into a socket—see Fig. 6—formed on the horizontal pipe $21^a$ and the latter conforms to the adjacent side of the bucket. Both pipes are held in place by spring metal clasps 22 secured to the side of the bucket, and whose free ends may be raised to allow insertion or removal of the pipes. Thus the air pipe may be used or dispensed with as conditions and judgment dictate.

The horizontal pipe $21^a$ has perforations in its under side as shown in Figs. 6, 3, and the upper end of the vertical pipe 21 projects through and above the top of the minnow compartment, as shown in Figs. 2, 5, 6, and is slightly tapered to allow convenient application of the nozzle of any form of air-pump, such as a rubber bulb or one of the reciprocating-piston type. It is obvious that air forced in the pipe 21 will be discharged through the holes in the pipe $21^a$, and thus effectively aerate the water. By locating the holes on the under side of the pipe and a little at one side of the center, the angle of discharge of the air jets is such that the air is spread out on, or over, the bottom of the bucket and thus disseminated in such manner as to effect greater aeration than would be practicable if the pipe discharged at its side or top.

As ordinarily constructed, minnow-buckets must be inverted or tilted in order to take in or discharge water from the chamber. Apart from the difficulty and labor incident to this operation,—especially when the water is a considerable distance below the elevation at which the angler sits or stands—it is chiefly objectionable on account of injuring the minnows and the danger of losing them. I have devised means that permit the bucket to be discharged or filled without tilting. As illustrated in Figs. 9 and 11 to 14, I form an opening in the bottom of the bucket and provide it with a removable closure, to wit, a screw cap, plug, or stopper, having a handle or stem that extends through and is guided in the top 5 and has an enlarged head for use in rotating or lifting the same. In Figs. 9, 11, and 13, a short tapered open-end tube 24 is fixed in the bottom 3 of the bucket and located adjacent to one of the corrugations or inbends 1ª. Wires crossing the tube prevent escape of minnows when the plug is raised. The stopper 24ª, which is preferably cork or rubber, is attached to the stem in such manner as to prevent rotation thereon. One means—see Fig. 13— is the provision of a stem socket 26ª having a horizontal toothed flange resting on the head of the stopper and a threaded rod passes through the same and is provided with a nut 27 for securing and compressing the stopper. Another construction is shown in Fig. 12, a screw plug 28ª fitting into a socket 28 having a flanged base. Still another is the simple screw cap 29ª screwed on a threaded flange 29. Thus various efficient valves may be formed.

It is apparent that by raising the plug or cap, water will discharge from the minnow-chamber; but, if the bucket be lowered or set into water, it will quickly refill. Again, if the cap or plug be raised and the bucket held under a spigot, the spent or de-aerated water will discharge and fresh water take its place, the one flowing out as the other flows in, and the cover of the minnow-chamber remaining closed and the chamber filled with water during the operation. This feature of my bucket is also particularly advantageous when filling from a boat or from a wharf or other support located a considerable height above the water, since it enables the bucket to be easily discharged and refilled by simply lowering it by the handle or by a rope attached to it. It is further available for emptying and refilling in shallow places where it is difficult or impracticable to dip the bucket without roiling the water. In any case, the minnows are not much disturbed and not injured. In practice it has been found desirable to make the discharge openings before described, over an inch in diameter, in order that discharge and refilling may be quickly effected.

The head 25ª of the valve stem 25 is preferably circular and milled or roughened. This head is located just above the flange or top portion of the minnow chamber so that it will not project above the rim even when the valve is raised to allow discharge or entrance of water. It is held in the raised position by friction. This may be applied by means of a spring presser 25ᵇ, shown in Fig. 10, the same consisting of a curved plate spring, one end of which is attached to the rim 7 and the other free end bearing on the stem.

In Figs. 1 and 5 I show a side of the bucket provided with an opening 30, provided with a wire guard and a flat screw-cap 31, applied on the inside. This opening may be utilized when the bucket is wholly or partly submerged in water, say in a tank or stream, to allow circulation of water through it and the valved openings in the bottom. It will be apparent the circulation is promoted or rendered more effective by locating the opening on the side of the bucket which is farthest from the bottom opening.

Either or both of the bottom and side openings may be kept constantly open when the bucket is supported by floats, and thus there will be no necessity to replenish the water in the bucket. Circulation in this and other cases may be further promoted by providing a central opening 32 and screw cap 33 in the bottom of the bucket—see Figs. 9 and 11. The caps of both openings 30 and 32 are applied on the inside, and are hence accessible only through the opening having lid or cover 6. The wire handle 34 is pivoted at 35 to the rim 7 at the ends of the bucket, and so shaped and proportioned that it folds within said rim as shown in Fig. 3. It has a bend 36 to receive the top of partition 8, and enable the handle to lie horizontal below the rim 8, which is of importance in storage, packing, or shipment of bucket, and sometimes in handling it when in use. The handle presses tightly against the side rim and is thus held in place under ordinary conditions.

I claim:

1. A minnow-bucket whose body is provided on the inner side with vertical projections arranged oppositely and equidistantly from the ends whereby they subserve the purposes specified.

2. A minnow-bucket having vertical side corrugations forming interior ribs which are spaced equidistantly from the ends, and a vertical partition extending between and secured to such ribs, substantially as described.

3. A minnow-bucket having an elliptical form and opposite vertical corrugations located on the longer sides and forming inbends, and a transverse vertical partition joining such inbends, and extended at its bottom horizontally at a considerable height above the bottom of the bucket and attached to the end wall of the latter, as and for the purposes specified.

4. A minnow-bucket having a body provided with vertical corrugations forming inbends on the sides of the body, rigid, transverse connections between opposite inbends, and an arched bottom, as shown and described.

5. A minnow-bucket having an air-supply pipe comprising a vertical portion and a horizontal portion, and spring clasps attached to the bucket-body and their free ends engaging the said pipe, as shown and described.

6. A minnow-bucket having a detachable air-supply pipe arranged interiorly and means secured to the body, and holding said pipe in working position, but adapted to be manipulated to release the same, as shown and described.

7. A minnow-bucket having an air-supply pipe formed of two parts or sections, one arranged vertically and the other horizontally and having a socket to receive the vertical one detachably, and means for holding the pipe in place for use, as shown and described.

8. A minnow-bucket having its bottom provided with an opening and a removable closure therefor, a rod or stem attached to such closure and extending to the top of the bucket, and a spring presser secured to the body and acting on the rod for holding it and the attached closure supported above the normal height, and in the open position as shown and described.

9. A minnow-bucket having a bottom opening provided with a short tube, a compressible plug adapted to fit in said tube, a lifting rod whose lower portion passes through the plug, and having a collar and nut for securing the plug and facilitating compression to enlarge the diameter of the plug when required, as shown and described.

AMOS W. HART.

Witnesses:
SOLON C. KEMON,
J. MIDDLETON.